United States Patent [19]
Alexander

[11] Patent Number: 5,813,072
[45] Date of Patent: Sep. 29, 1998

[54] AUTOMATIC SAFETY LEGS FOR DOCK LEVELER

[75] Inventor: James C. Alexander, London, Canada

[73] Assignee: United Dominion Ind., Inc., Charlotte, N.C.

[21] Appl. No.: 757,945

[22] Filed: Nov. 27, 1996

[51] Int. Cl.⁶ .................................................. E01D 1/00
[52] U.S. Cl. ............................................. 14/71.1; 14/71.3
[58] Field of Search .................................. 14/69.5, 71.1, 14/71.3, 71.7

[56] References Cited

U.S. PATENT DOCUMENTS

| | | | |
|---|---|---|---|
| 3,902,213 | 9/1975 | Pfleger et al. | 14/71.3 |
| 4,328,602 | 5/1982 | Bennett | 14/71.3 |
| 5,440,772 | 8/1995 | Springer et al. | 14/69.5 |

Primary Examiner—James Lisehora
Attorney, Agent, or Firm—Sughrue, Mion, Zinn, Macpeak & Seas, PLLC

[57] ABSTRACT

A dock leveler comprises a deck pivotally mounted at one end thereof for movement and having a lip mounted at the other end thereof. A safety leg assembly is pivotally mounted to an underside of said the and is biased into an extended position. A cam structure is carried by the safety leg assembly and pivotal therewith. A spring biases the cam in a direction to maintain the safety legs in the extended position. The cam structure has a slot into which a pin mounted on the safety legs engages. If the deck falls rapidly a surface on the cam engages a member on a stop block. This causes the cam to rapidly move but the spring attached to the pin cannot cause the legs to move as rapidly and it shifts in the slot. This exposes the safety leg supporting surfaces which contact a surface on the stop block to limit travel of the deck. If the deck moves slowly downward (second condition) the cam surface engages the member on the stop block gradually and thus the spring connected to the pin maintains the bias on the legs causing them to deflect with the cam and slowly retract.

20 Claims, 3 Drawing Sheets

AUTOMATIC SAFETY LEGS FOR DOCK LEVELER

BACKGROUND OF THE INVENTION

1. Field of the Invention

This invention is related to material handling equipment and in particular to mechanical dock levelers. It is directed to safety legs used on such equipment as a means to reduce the travel of a dock leveler in the event the lip of the leveler is no longer supported by the vehicle being loaded or unloaded.

2. Prior Art

Safety legs on mechanical dock levelers are known and widely used. They are effective in limiting the height that a dock leveler will drop if a truck should pull out with a load on the dock leveler. The major problem with safety legs is that they can interfere with the operation of the dock leveler when the truck bed is lower than the dock by preventing the dock leveler from following the downward travel of a truck as the suspension deflects with the addition of load. That is, as a vehicle is being loaded it will float downward as the increased load weighted down the suspension of the vehicle. Float in the range of twelve inches or more is not abnormal. In those situations the bed of the vehicle may be lower than dock leveler and the dock leveler, pivoted for movement to follow the movement of the truck bed, will have its deck canted downward. The safety legs are typically mounted at the end of the deck and therefore may strike the ground or frame of the dock leveler thereby preventing the deck from angling downward any further.

Many different methods have been devised to retract the safety legs to prevent them from interfering with the operation of the dock leveler yet make them available when required. Some hold the safety legs retracted when the lip is extended onto the truck bed. Examples are described in U.S. Pat. Nos. 4,328,602; 4,619,008 and 4,974,276. A limitation common to all of these devices is that the they require the safety legs to rapidly move to the engaged position to prevent excessive fall of the dock leveler. This is an obvious compromise to safety.

Other techniques allow a limited amount of downward movement before the safety legs contact the stop block. This is shown in U.S. Pat. No. 5,490,772. The limitation of these devices is that the they may not provide sufficient free movement of the dock leveler when the truck has a soft suspension or is heavily loaded thereby exhibiting a large amount of deflection.

SUMMARY OF INVENTION

It is therefore an object of this invention to provide for an improved safety leg device that does not impede the range of movement of a dock leveler.

It is a further object of this invention to provide an improved safety leg device that continuously maintains the safety legs in a ready position.

This invention is a safety leg device which provides multiple stopping positions and unlimited downward travel under normal operating conditions, yet maintains the safety legs in the engaged position for emergency drop conditions. This emergency condition, when the dock leveler is falling, is denoted herein as the "first condition". Moreover, in accordance with this invention the safety legs are automatically retracted as loading dock operations normally proceed, for example, with the leveler slowly lowering during a loading operation as the vehicle is loaded and floats downward. This condition will be denoted herein as the "second condition".

In accordance with this invention a dock leveler comprises a deck pivotally mounted at one end thereof for movement and having a lip mounted at the other end thereof. A safety leg assembly is pivotally mounted to an underside of said deck and is biased into an extended position. A cam structure is carried by the safety leg assembly and pivotal therewith. A spring biases the cam in a direction to maintain the safety legs in the extended position. The cam structure has a slot into which a pin mounted on the safety legs engages. The pin is biased in the slot by a spring connecting the pin to the cam. If the deck falls rapidly a surface on the cam engages a member on a stop block. This causes the cam to move rapidly but the spring attached to the pin cannot cause the legs to move as rapidly and it shifts in the slot. This exposes the safety leg supporting surfaces which contact a surface on the stop block to limit travel of the deck. This is the first condition.

If the deck moves slowly downward (second condition) the cam surface engages the member on the stp block gradually and thus the spring connected to the pin maintains the bias on the legs causing them to deflect with the cam and slowly retract. Thus as the deck moves downward in a second condition, the safety leg assembly slowly retracts as the leveler lowers. The leveler can thus operate at its lowest positions as the truck is being lowered. However, in case of an abrupt fall from an intermediate position, other support positions are capable of limiting further downward travel of the dock leveler.

These and other objects of this invention will be apparent from the drawing and the description of the preferred embodiment that follows.

DESCRIPTION OF PREFERRED EMBODIMENT

Figure 1:
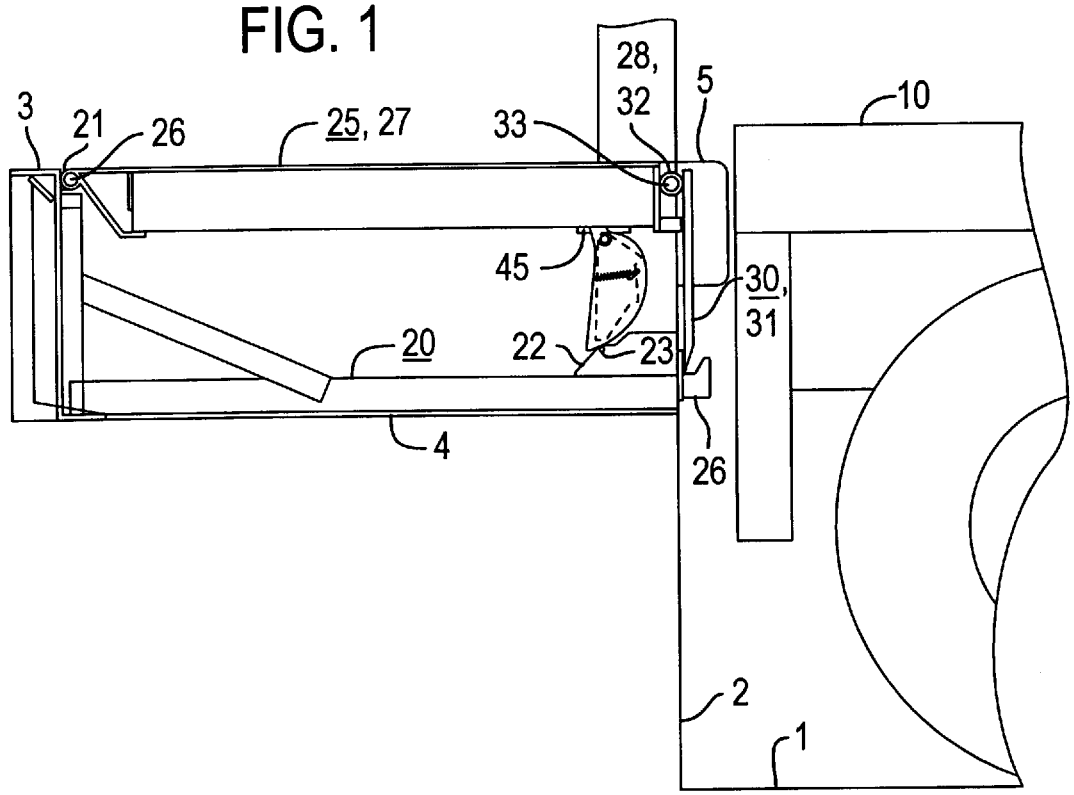
FIG. 1 is a side view illustrating a dock leveler with the automatic safety legs of this invention.

Referring to FIG. 1, a side view of a loading dock are depicted which has a driveway surface 1, a dock face 2, a dock floor 3 dock floor, and a recessed pit 4. Dock bumpers 5 limit the position of the transport vehicle 10 and protect the dock wall from impact damage. A dock leveler frame assembly 20 is installed in the pit 4 and has a rear hinge 21, safety legs stop block 22 and lip keepers 26. A pin 23 extends from the side of the stop block 22. A dock leveler deck assembly 25 is attached at the rear to the frame assembly 20 by a hinge pin 26. The deck assembly has a deck plate 27 and lip hinge 28. A lip assembly 30, comprising a lip plate 31 and a lip hinge 32 is attached to the deck assembly 25 by a lip hinge pin 33. On the underside of the deck assembly 25 is a safety leg assembly 35.

Figure 2:
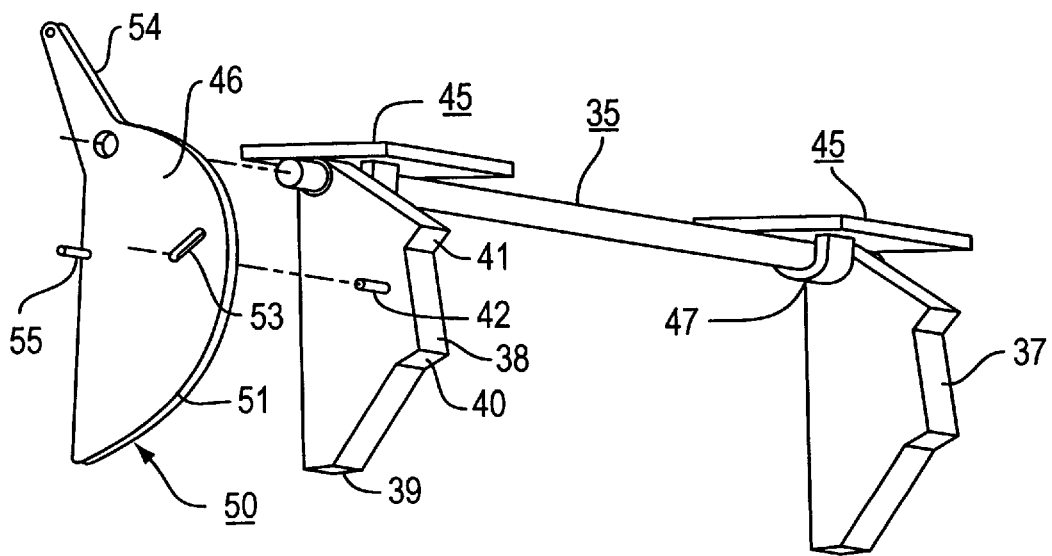
FIG. 2 is an exploded view of the safety leg assembly and the cam assembly.

As shown in FIG. 2, the safety leg assembly is carried by two hinge assemblies 45 attached to the underside of the deck assembly 25 and has a shaft 36 and two safety legs 37 and 38. The safety legs each have multiple support surfaces 39, 40 and 41. The safety leg 38 has a pin 42 extending laterally from it. A cam assembly 50 has a cam plate 46 with a slotted hole 53, a lever 54, and a pin 55. The cam assembly 50 pivots on the end of the shaft 36 and the pin 42 on the safety legs 38 protrudes through the slotted hole 53.

Figure 3:
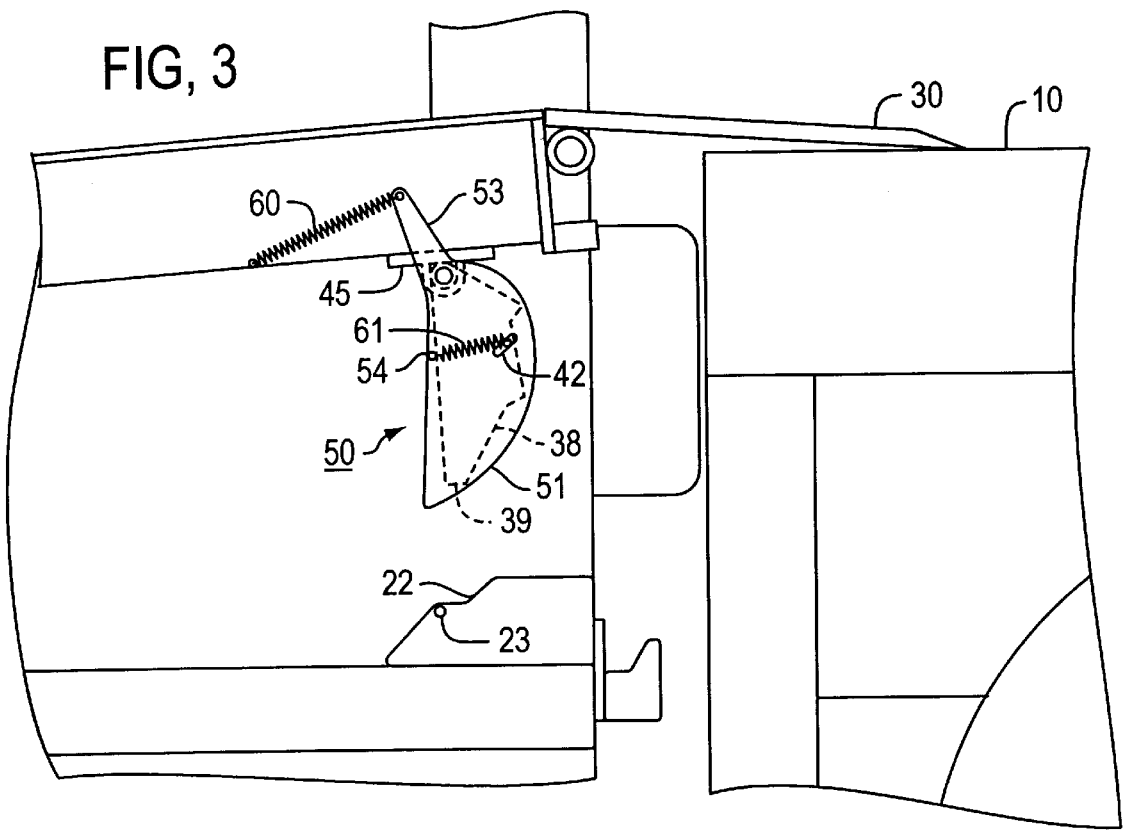
FIG. 3 is a view of the safety leg device of this invention when the lip of the dock leveler is resting on a truck which above dock level.

FIG. 3 illustrates the safety leg assembly 35 mounted on the deck assembly 25. A spring 60 has one end attached to the deck assembly 25 and the other end to the lever 53. The spring 60 urges the cam assembly 50 counterclockwise to the position illustrated in this figure. A spring 61 has one end attached to the pin 55 on the cam assembly 50 and the other end to the pin 42 on the safety leg 38. The spring 61 urges the safety legs clockwise against the pin 42 as illustrated in FIG. 3.

The operation of the device will now be explained. When the dock leveler is at floor level or above, the spring 60 holds the cam assembly 50 forward as illustrated in FIGS. 1 and 3. The spring 61 urges the safety legs 38, 39 clockwise so that the pin 42 on the safety leg 38 is in contact with the rear of the slotted hole 53 in the cam plate 46. Thus the contact surfaces 39, 40 and 41 of the safety legs 37 and 38 are held behind the forward edge 51 of the cam plate 46. This is illustrated in FIG. 3 by the dotted lines showing the profile shape of the safety leg 38 and the contact surfaces within the area of the cam plate. As illustrated, the lip 30 is resting on the vehicle bed 10 thereby supporting the deck. The safety legs 38,39 are above the stop block 22.

Figure 4:
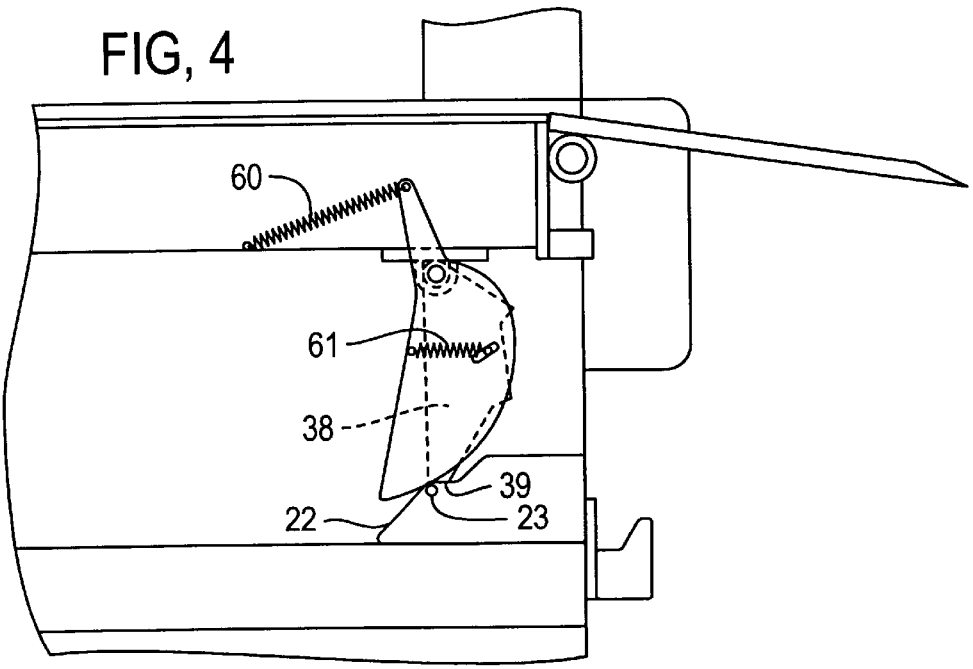
FIG. 4 is a view of the safety legs of this invention engaging the stop block when the leveler drops rapidly.

If the truck should pull out and allow the dock leveler to drop as in FIG. 4, the cam plate 51 rotates clockwise when it contacts pin 23 on the stop block 22. If the dock leveler drops rapidly, the force of the spring 61 will be unable to accelerate the safety leg assembly 35 quickly enough to rotate it before the contact surfaces 39 strike the top of the stop blocks 22 and support the dock leveler. Thus, the cam plate 51 rotates counterclockwise and the slot 53 moves relative to the pin 42. The spring force of spring 61 cannot shift the pin to the left quickly enough and thus a support surface, illustrated in FIG. 4 as 39 will be exposed to the stop block 22. This operation is the intended safety feature of the device to limit downward travel of the dock leveler in the situation where the vehicle pulls away leaving the deck loaded and unsupported. As defined herein this is the "first condition" of use.

Figure 5:
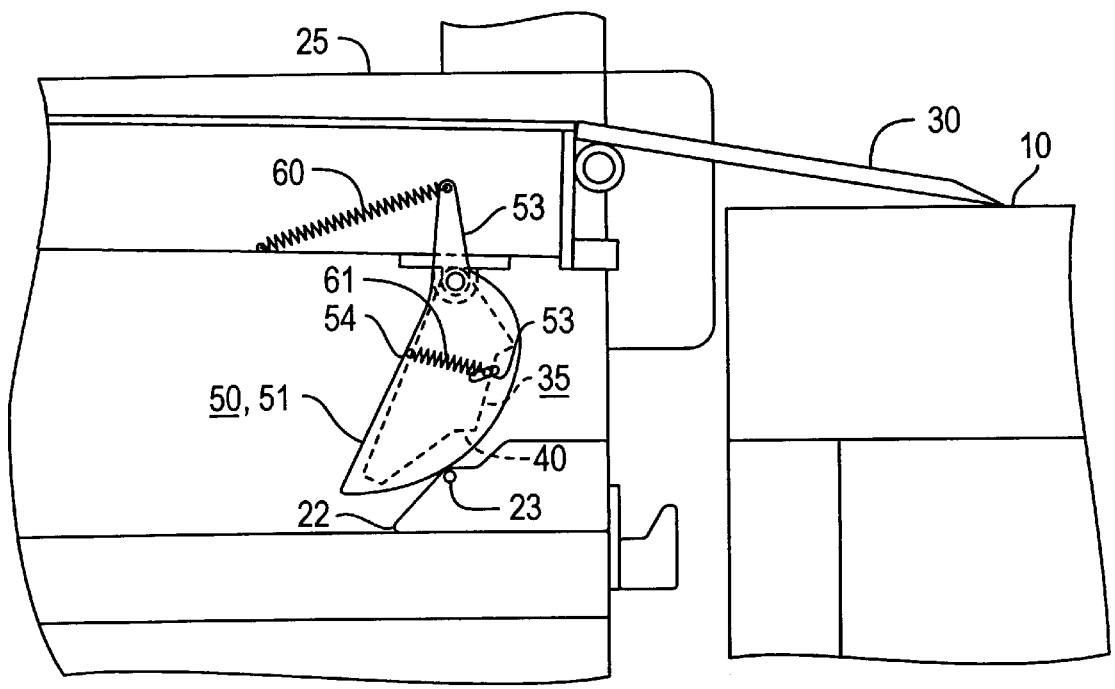
FIG. 5 is a view of the safety retracting automatically when the leveler lowers with a low truck.

However, when the dock leveler moves downward as the vehicle suspension deflects, this motion is gradual over time. The cam plate 51 will first contact the pin 23 and then slowly rotate as it contacts the pin 23 and remains biased in that position by spring 60. As shown in FIG. 5, the spring 61 will continue to bias the pin 42 in the slot 53 and hold the safety legs 38, 39 in that position. This causes the safety legs 38, 39 to rotate with the cam plate and not contact the stop blocks 22. Consequently as the bed 10 continues to float downward, with the lip 30 still supporting the deck 25, the safety legs will not contact the stop block 22. This normal use may continue and is the "second condition" of use.

Figure 6:
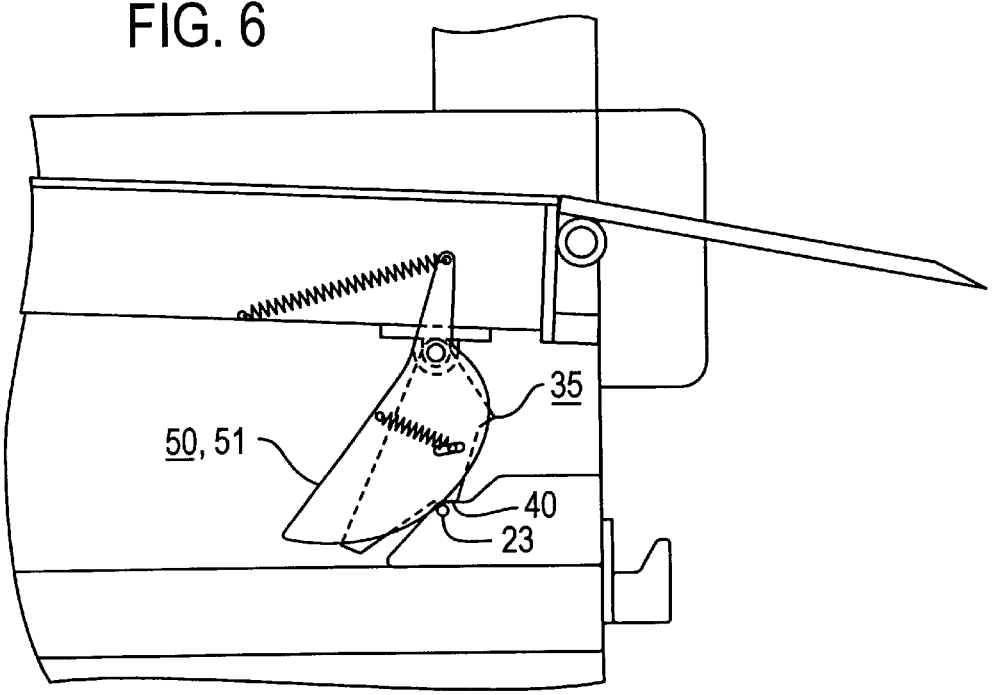
FIG. 6 is a view of the safety legs engaging the stop block at the second stage position when the leveler drops rapidly.

FIG. 6 illustrates the dock leveler falling rapidly from the position shown in FIG. 5. As in the "first condition" described previously for FIG. 4, the pin 23 causes the cam plate 51 to quickly rotate but the force of the spring 61 will be unable to accelerate the safety legs 38, 39 quickly enough to rotate them before the contact surfaces 40 strike the top of the stop blocks 22 and support the dock leveler. Similarly, the stock block 22 will engage the surfaces 41 when the leveler falls rapidly from a lower position.

It is apparent that modifications of this invention may be practiced without departing from the essential scope of this invention. For example, any number or configuration of contact surfaces may be used on the safety legs.

I claim:

1. A dock leveler comprising:

a deck pivotally mounted at one end thereof for movement and having a lip mounted at the other end thereof;

a safety leg assembly pivotally mounted to an underside of said deck, said safety leg assembly having at least one safety leg biased into an extended position;

cam means carried by said safety leg assembly and pivotal therewith, said cam means having means for relative movement between said cam means and said at least one safety leg to maintain said at least one safety leg in an extended position as said deck moves downward in a first condition, and a member adapted to contact said cam means to move said cam means permitting said means for relative movement to retract said at least one safety leg as said deck moves downward in a second condition, thereby allowing said safety leg assembly to remain extended and limit downward travel of said dock leveler if said deck moves downward in said first condition and to retract said at least one safety leg as long as said deck moves downward in said second condition.

2. The dock leveler of claim 1 further comprising a first spring coupled to said cam means to bias said safety leg assembly into said extended position and to bias said cam means in a first direction.

3. The dock leveler of claim 2 further comprising a second spring, said second spring operatively coupled to said at least one safety leg and to said cam means to bias said safety leg in a second direction which is opposite to said first direction, said means for relative motion between cam means and said safety leg biasing said safety leg in said second direction, wherein said safety leg assembly is held in said extended position as said deck lowers.

4. The dock leveler of claim 3 wherein said means for relative motion comprises a pin carried by said at least one safety leg, and a slot in said cam means engaging said pin and wherein said second spring is coupled to said pin.

5. The dock leveler of claim 1 further comprising a stop block positioned to contact said safety leg assembly, said stop block including said member adapted to contact said cam means, said cam means having a projecting surface contacting said member before said safety leg assembly contacts said stop block whereby contact of said projecting surface causes said cam means and said safety leg assembly to pivot together allowing said deck to lower when said deck in lowered in said second condition.

6. The dock leveler of claim 1 wherein said means for relative movement between said safety leg and said cam means comprises a spring to maintain the position of said safety leg relative to said cam means, wherein when said cam means contacts said member when said deck moves downward in said second condition no relative motion between said cam means and said safety leg assembly occurs such that said safety leg is progressively retracted.

7. The dock leveler of claim 6 wherein said means for relative movement comprises a slot in said cam means and a pin coupled to said safety leg assembly and moveable in said slot.

8. The dock leveler of claim 1 wherein said member comprises a stop block and said at least one safety leg having multiple support positions to engage said stop block at discrete points in the downward travel of said deck.

9. The dock leveler of claim 8 further comprising a second safety leg, said second safety leg having multiple support positions aligned with those on said first safety leg.

10. The dock leveler of claim 8 wherein said cam means and said one safety leg are mounted on a common axle for rotation.

11. A safety leg assembly for a dock leveler having a pivotally mounted deck, said safety leg assembly comprising:
   at least one safety leg pivotally mounted to an underside of said deck and biased into an extended position, said at least one safety leg having multiple support surfaces;
   cam means for permitting said safety leg to remain extended as said deck moves downward in a first condition and for progressively retracting said safety leg as said deck moves downward in a second condition but permitting said one safety leg to subsequently limit downward travel of said deck if said deck subsequently moves in said first condition after said safety leg has started to retract;
   a member adapted to contact said cam means to move said cam means while not retracting said safety leg whenever said deck moves downward in said first condition, thereby allowing said safety leg to remain extended and limit downward travel of said dock leveler as one of said support surfaces contacts said member.

12. The safety leg assembly of claim 11 further comprising a first spring coupled to said cam means to bias said safety leg into said extended position and to bias said cam means in a first direction.

13. The safety leg assembly of claim 12 further comprising a second spring, said second spring operatively coupled to said safety leg and to said cam means to bias said safety leg in a second direction which is opposite to said first direction wherein said safety leg assembly is held in said extended position as said deck lowers.

14. The safety leg assembly of claim 13 wherein said cam means further comprises means for relative motion between said cam means and said safety leg and comprising a pin carried by said safety leg and a slot in said cam means engaging said pin and wherein said second spring is coupled to said pin.

15. The safety leg assembly of claim 11 wherein said member comprises a stop block positioned to contact said support surfaces on said safety leg, said member having a projecting pin to contact said cam means, said cam means having a projecting surface contacting said pin before said support surfaces on said safety leg contacts said stop block whereby contact of said projecting pin causes said cam means and said safety leg to pivot together allowing said deck to lower when said deck in lowered in said second condition.

16. The safety leg assembly of claim 11 wherein said cam means includes means permitting relative movement between said safety leg and said cam means wherein, when said cam means contacts said member when said deck moves downward in said second condition no relative motion between said cam means and said safety leg assembly occurs such that said safety leg is progressively retracted.

17. The safety leg of claim 16 wherein said means permitting relative movement comprises a spring operatively coupling said cam means to said safety leg.

18. The safety leg assembly of claim 11 wherein said member comprises a stop block to engage said multiple support positions on said safety leg whereby downward travel of said deck is stopped at discrete points in its downward travel.

19. The safety leg assembly of claim 18 further comprising a second safety leg, said second safety leg having multiple support positions aligned with those on said first safety leg.

20. The safety leg assembly of claim 18 wherein said cam means and said one safety leg are mounted on a common axle for rotation.

* * * * *